(12) United States Patent
Ye et al.

(10) Patent No.: US 11,885,982 B1
(45) Date of Patent: *Jan. 30, 2024

(54) MULTILAYER OPTICAL BARRIER

(71) Applicant: Meta Platforms Technologies, LLC, Menlo Park, CA (US)

(72) Inventors: Sheng Ye, Redmond, WA (US); Andrew John Ouderkirk, Kirkland, WA (US); Christopher Stipe, Woodinville, WA (US); Christopher Yuan Ting Liao, Seattle, WA (US); Hayden Erik Hernandez, Oxord (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,062

(22) Filed: Jan. 31, 2023

Related U.S. Application Data

(63) Continuation of application No. 17/404,155, filed on Aug. 17, 2021, now Pat. No. 11,598,906, which is a
(Continued)

(51) Int. Cl.
*C09D 175/14* (2006.01)
*B29C 55/14* (2006.01)
(Continued)

(52) U.S. Cl.
CPC ............... *G02B 3/02* (2013.01); *B29C 55/00* (2013.01); *B29C 55/02* (2013.01); *B32B 27/08* (2013.01); *B32B 27/306* (2013.01); *B32B 27/40* (2013.01); *G02B 1/04* (2013.01); *G02B 1/041* (2013.01); *G02B 1/06* (2013.01); *G02B 1/10* (2013.01); *G02B 1/11* (2013.01); *B32B 2255/10* (2013.01); *B32B 2551/00* (2013.01)

(58) Field of Classification Search
None
See application file for complete search history.

(56) References Cited

U.S. PATENT DOCUMENTS

| 7,866,348 B2 | 1/2011 | Garver et al. |
| 9,079,381 B2 | 7/2015 | Uebayashi et al. |
| 2018/0222135 A1 | 8/2018 | Dias Borges Vianna et al. |

FOREIGN PATENT DOCUMENTS

| CN | 203622873 U | 6/2014 |
| GB | 2542638 A | 3/2017 |
| JP | H07251451 A | 10/1995 |

OTHER PUBLICATIONS

Huang R., et al., "Microconfinement Effect on Gas Barrier and Mechanical Properties of Multilayer Rigid/Soft Thermoplastic Polyurethane Films," Journal of Applied Polymer Science, 2015, pp. 1-11.

*Primary Examiner* — Ramsey Zacharia
(74) *Attorney, Agent, or Firm* — Greenberg Traurig, LLP

(57) ABSTRACT

A liquid lens architecture includes a transparent substrate, a multilayer thermoplastic polyurethane (TPU)-based membrane overlying at least a portion of the transparent substrate, and a liquid layer disposed between and abutting the transparent substrate and the multilayer thermoplastic polyurethane-based membrane. The TPU-based membrane may exhibit a reversible elastic response to imposed strains of up to approximately 2% and is configured to limit the transpiration of fluid to less than approximately $10^{-2}$ g/m²/day.

20 Claims, 5 Drawing Sheets

Related U.S. Application Data continuation of application No. 16/730,658, filed on Dec. 30, 2019, now Pat. No. 11,175,435.

(60) Provisional application No. 62/898,010, filed on Sep. 10, 2019.

(51) Int. Cl.
| | |
|---|---|
| *C09D 167/02* | (2006.01) |
| *G02B 3/02* | (2006.01) |
| *B29C 55/02* | (2006.01) |
| *B32B 27/08* | (2006.01) |
| *G02B 1/10* | (2015.01) |
| *B32B 27/40* | (2006.01) |
| *G02B 1/04* | (2006.01) |
| *B29C 55/00* | (2006.01) |
| *G02B 1/06* | (2006.01) |
| *G02B 1/11* | (2015.01) |
| *B32B 27/30* | (2006.01) |

MULTILAYER OPTICAL BARRIER

CROSS REFERENCE TO RELATED APPLICATIONS

This application is a Continuation of U.S. application Ser. No. 17/404,155 filed, on Aug. 18, 2021, which is a Continuation of U.S. application Ser. No. 16/730,658 filed on 30 Dec. 2019, which claims the benefit of priority under 35 U.S.C. § 119(e) of U.S. Provisional Application No. 62/898,010, filed Sep. 10, 2019, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 2:
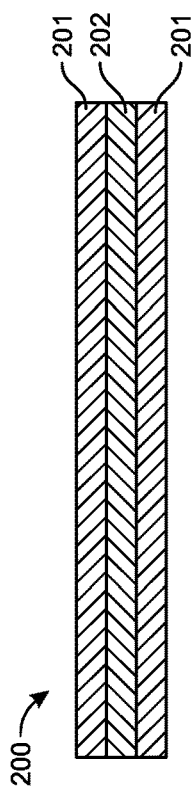
FIG. 2 is a cross-sectional illustration of an example tri-layer (ABA) polymer composite membrane according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Variable focus liquid lenses have been proposed for a variety of applications, including eyeglasses, cameras, camcorders, telescopes, binoculars, projectors, as well as tunable optics for artificial reality and augmented reality systems. As will be appreciated, liquid lenses may enable improved imaging system flexibility over a wide variety of applications requiring rapid focusing. By integrating a liquid lens, an imaging system may quickly change the plane of focus thereby providing sharper images regardless of the distance to the object being viewed.

In some example liquid lens architectures, a fixed volume of liquid may be disposed between a rigid lens or substrate and a thin, transparent elastic membrane. In further liquid lens architectures, the enclosed volume of liquid may be increased or decreased during operation of the lens. In each of the foregoing approaches, by moving the elastic membrane the liquid within the lens assembly may be redistributed such that the curvature of the elastic membrane is changed. The changed curvature of the liquid lens surface can vary the optical power of the lens.

A variety of materials may be used to form the elastic membrane. Thermoplastic polyurethanes (TPUs), for example, may provide excellent elastic response after stretching and annealing processes. Aliphatic TPUs, due to their small crystal size and low crystallization of hard segments, may be characterized by high optical clarity but poor liquid barrier performance. On the other hand, aromatic TPUs may provide decent barrier performance but are typically characterized by low optical clarity due to a relatively large crystal size. Further materials such as PET, PEVOH, and PVDF are brittle and typically exhibit an inadequately small elastic deformation region and are thus inadequate for liquid lens systems when implemented as stand-alone layers.

Notwithstanding recent developments, it would be advantageous to provide a transparent elastic membrane exhibiting a reproducible elastic response under small strains over multiple actuation cycles while having effective barrier layer properties.

The present disclosure relates generally to multilayer membranes, including bilayer and tri-layer structures, and more specifically to compositions, multilayer architectures, and methods of manufacturing multilayer membranes that may be integrated into liquid lenses. For instance, multilayer structures may include 5, 10, 20, 50, or more individual layers. Example membranes include thermoplastic polyurethane (TPU)-based multilayer structures. The disclosed multilayer membranes include at least one thermoplastic polyurethane layer and may be optically transparent, an effective barrier layer to liquid lens fluids, and exhibit an elastic response under small strains over repeated cycles.

As used herein, a layer or multilayer that is "transparent" or "optically transparent" may, in some examples, be characterized by a transmissivity within the visible spectrum of at least approximately 90% (e.g., 90, 95, 96, 97, 98, 99, 99.5, or 99.9%, including ranges between any of the foregoing values) and less than approximately 10% bulk haze. Furthermore, the disclosed multilayer membranes may serve as barrier layers that, for example, limit the transpiration (diffusion) of a liquid lens fluid to less than approximately $10^{-2}$ g/m$^2$/day (e.g. less than approximately $10^{-3}$, $10^{-4}$, $10^{-5}$ or $10^{-6}$ g/m$^2$/day, including ranges between any of the foregoing values).

The disclosed multilayer membranes may include two or more individual polymer layers arranged in a stacked configuration. For instance, a bilayer polymer membrane may have an A-B structure and a tri-layer polymer membrane may have an A-B-A structure or an A-B-C structure, where each layer A or layer C may include an optically transparent aliphatic TPU layer or an optically transparent aromatic TPU layer and each layer B may include an optically transparent barrier layer, such as a layer including polyvinylidene fluoride (PVDF), chlorotrifluoroethylene (CTFE) polymer, polyvinylidene chloride (PVDC), ethylene vinyl alcohol (EVOH) copolymer, or other fluoropolymers, and the like. In certain embodiments, layer B or layer C may be thinner than layer A. In certain embodiments, the difference in the solubility parameters of polymer A and polymer B may be less than 10 MPa$^{1/2}$ or less than 5 MPa$^{1/2}$, and the difference in the solubility parameters of polymer B and polymer C may be less than 10 MPa$^{1/2}$ or less than 5 MPa$^{1/2}$. A further example structure may include an aromatic/aliphatic multilayer, such as an A-C-A-C multilayer, which may further include one or more additional polymer layers, such as a transparent barrier layer, e.g., B-A-C-A-C or B-A-C-A-C-B or B-A-C-A-C-B-A-C, etc.

In various bi-layer and tri-layer architectures, the total thickness of the multilayer membrane may be less than approximately 1 mm, e.g., approximately 100 micrometers, approximately 200 micrometers, approximately 300 micrometers, approximately 400 micrometers, approximately 500 micrometers, approximately 750 micrometers, or approximately 1000 micrometers, including ranges between any of the foregoing values, whereas the thicknesses of the individual polymer layers A, B, and C may independently range from approximately 1 micrometer to approximately 250 micrometers, e.g., approximately 1 micrometer, approximately 2 micrometers, approximately 5 micrometers, approximately 10 micrometers, approximately 20 micrometers, approximately 30 micrometers, approximately 40 micrometers, approximately 50 micrometers, approximately 100 micrometers, approximately 150 micrometers, approximately 200 micrometers, or approximately 250 micrometers, including ranges between any of the foregoing values.

According to further embodiments, a multilayer TPU-based membrane may have an A-B-A-B- . . . A-B-A stacked architecture, where each layer A may include an optically transparent aliphatic TPU layer and each layer B may include an optically transparent aromatic TPU layer. A total thickness of such a stacked architecture may be less than approximately 1 mm, e.g., approximately 100 micrometers, approximately 200 micrometers, approximately 300 micrometers, approximately 400 micrometers, approximately 500 micrometers, approximately 750 micrometers, or approximately 1000 micrometers, including ranges between any of the foregoing values. The thickness of each individual layer A and layer B may independently range from approximately 50 nm to approximately 10 micrometers, e.g., approximately 50 nm, approximately 100 nm, approximately 200 nm, approximately 300 nm, approximately 400 nm, approximately 500 nm, approximately 1000 nm, approximately 2000 nm, approximately 5000 nm, or approximately 10000 nm, including ranges between any of the foregoing values.

Example TPU materials may include polyester TPUs, polyether TPUs, and polycaprolactone TPUs. Moreover, suitable TPUs may include aromatic TPUs and aliphatic TPUs. Aromatic TPUs may be based on isocyanates such as methylene diphenyl diisocyanate (MDI), including MDI isomers such as 2,2'-MDI, 2,4'-MDI, and 4-4'-MDI. Example aliphatic TPUs may be based on isocyanates such as hydrogenated methylene diphenyl diisocyanate (H12 MDI), hexamethylene diisocyanate (HDI), and isophorone diisocyanate (IPDI).

According to still further embodiments, a multilayer TPU-based membrane may include an A-B, A-B-A, A-B-C, or A-B-A-B- . . . stacked architecture as in the previous embodiments and may additionally include a supplemental stacked architecture over either or both sides of the A-B, A-B-A, A-B-C, or A-B-A-B- . . . multilayer structure. That is, according to some embodiments, a multilayer TPU-based membrane may have an A-B-A-B- . . . C-D-C-D stacked architecture or a D-C-D-C- . . . -A-B-A-B- . . . -C-D-C-D stacked architecture. The supplemental -C-D-C-D architecture may include a multilayer antireflective (ARC) coating, for example.

The -C-D-C-D architecture, if provided, may be optically transparent and accordingly exhibit less than approximately 10% bulk haze and a transmissivity within the visible spectrum of at least approximately 90%. For instance, a -C-D-C-D antireflective coating may be configured to maintain at least approximately 90% transmissivity over approximately 10$^6$ actuation cycles and an induced engineering strain of up to approximately 2%. In some embodiments, the antireflective coating may exhibit a reflectivity within the visible spectrum of less than approximately 3%.

Layer C and layer D of a multilayer -C-D-C-D structure may include any suitable dielectric materials, including silicon dioxide, zinc oxide, aluminum oxide, and magnesium fluoride, although additional dielectric materials are contemplated. For example, layer C and layer D of a multilayer -C-D-C-D structure may include polymer materials having alternating high and low refractive indices.

Example high index polymers may include poly(pentabromophenyl methacrylate) (PPBPMA), poly(pentabromophenyl acrylate), poly(pentabromobenzyl methacrylate), poly(pentabromobenzyl acrylate), poly(2,4,6-tribromophenyl methacrylate), poly(vinylphenylsulfide), poly(1-napthyl methacrylate), poly(2, vinylthiophene), poly(2,6-dichlorostyrene), poly(N-vinylphthalimide), poly(2-chlorostyrene), and poly(pentachlorophenyl methacrylate).

Example low index polymers may include poly(1,1,1,3,3,3-hexafluoroisopropyl acrylate) (PHFIA), poly(2,2,3,3,4,4,4-heptafluorobutyl acrylate), poly(2,2,3,3,4,4,4-heptafluorobutyl methacrylate), poly(2,2,3,3,3-pentafluoropropyl acrylate), poly(1,1,1,3,3,3-hexafluoroisopropyl methacrylate), poly(2,2,3,4,4,4-hexafluorobutyl acrylate), poly(2,2,3,4,4,4-hexafluorobutyl methacrylate), poly(2,2,3,3,3-pentafluoropropyl methacrylate), poly(2,2,2-trifluoroethyl acrylate), poly(2,2,3,3-tetrafluoropropyl acrylate), poly(2,2,3,3-tetrafluoropropyl methacrylate), and poly(2,2,2-trifluoroethyl methacrylate).

Layer C and layer D may each independently have a thickness ranging from approximately 1 nanometer to approximately 500 nanometers, e.g., approximately 1, approximately 2, approximately 3, approximately 5, approximately 10, approximately 20, approximately 50, approximately 100, approximately 200, or approximately 500 nanometers, including ranges between any of the foregoing values.

In accordance with some embodiments, an antireflective coating (i.e., a -C-D-C-D structure) may operate to gradually decrease the refractive index between that of the multilayer TPU-based membrane and an adjacent, typically lower index material (e.g., air). In various embodiments, an antireflective coating may include multiple layers of varying refractive index and/or one or more layers having a refractive index gradient.

According to various embodiments, the multilayer TPU-based membranes may be co-extruded or cast, stretched, and annealed to achieve an elastic response during actuation of a liquid lens.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-8, detailed descriptions of multilayer TPU-based membranes and liquid lens designs including such membranes. The discussion associated with FIGS. 1-4 includes a description of example multilayer (composite) TPU-based membrane architectures. As disclosed herein, multilayer (or composite) structures include two or more discrete polymer layers having different polymer compositions. The discussion associated with FIG. 5 includes a description of a manufacturing method for forming a liquid lens having a multilayer TPU-based membrane. The discussion associated with FIG. 6 includes a description of the mechanical behavior of example multilayer membranes. The discussion associated with FIGS. 7 and 8 relates to exemplary virtual reality and augmented reality devices that may include an optical element as disclosed herein.

Figure 1:
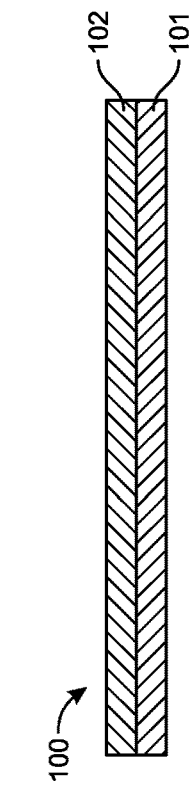
FIG. 1 is a cross-sectional illustration of an example bi-layer (AB) polymer composite membrane according to some embodiments.

Referring to FIG. 1, illustrated is a cross-sectional view of a TPU-based bilayer membrane. Bilayer membrane 100 may include an optically transparent aliphatic TPU layer or an optically transparent aromatic TPU layer 101 and a barrier layer 102 overlying the TPU layer 101. In certain examples, barrier layer 102 may include one or more of polyvinylidene fluoride (PVDF), chlorotrifluoroethylene (CTFE) polymer, polyvinylidene chloride (PVDC), ethylene vinyl alcohol (EVOH) copolymer, or another fluoropolymer, etc.

According to some embodiments, FIG. 2 is an illustration of an example tri-layer (ABA) TPU-based polymer membrane 200, where layers 201 may each include an optically transparent aliphatic TPU layer or an optically transparent aromatic TPU layer, and intervening layer 202 may include an optically transparent barrier layer, such as a polyvinylidene fluoride (PVDF) layer, a chlorotrifluoroethylene (CTFE) polymer layer, a polyvinylidene chloride (PVDC) polymer layer, an ethylene vinyl alcohol (EVOH) copolymer layer, a fluoropolymer layer, etc. The elastic modulus of the aliphatic or aromatic TPU layers 201 may be less than the elastic modulus of the intervening barrier layer 202, which may inhibit the generation and/or propagation of cracks in any of the layers in response to repeated actuation. As will be appreciated, although not unillustrated, a tri-layer TPU-based polymer membrane may have an ABC architecture, where the C layer may include a further optically transparent aliphatic or aromatic TPU layer or other optically transparent polymer layer.

In certain embodiments, the difference in the solubility parameters of the A and B layers in the embodiments of Examples 1 and 2 may be less than approximately 10 $MPa^{1/2}$, e.g., less than approximately 5 $MPa^{1/2}$. In some embodiments, the thickness of each of the A layers may be greater than the thickness of the B layer, and the total AB or ABA structure thickness may be less than approximately 1 millimeter, e.g., less than approximately 500 micrometers or less than approximately 300 micrometers.

Figure 3:
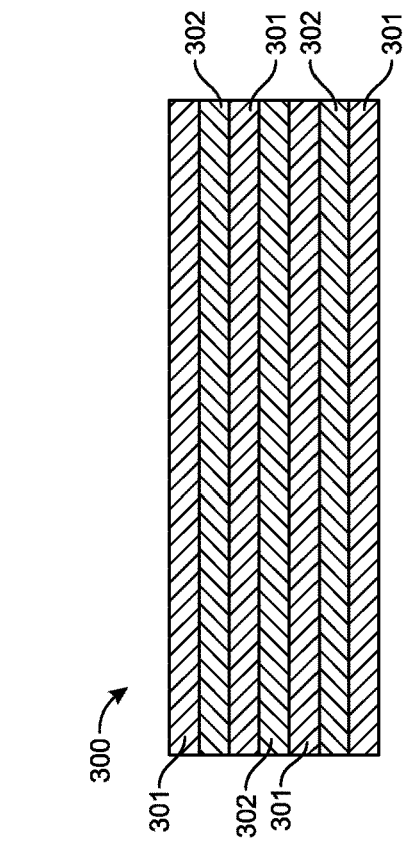
FIG. 3 is a cross-sectional illustration of an example multilayer polymer composite membrane according to some embodiments.

According to further embodiments, FIG. 3 shows an example multilayer TPU-based membrane 300, where each layer 301 may include an optically transparent aliphatic TPU layer and each alternating layer 302 may include an optically transparent aromatic TPU layer. The total multilayer extruded membrane thickness may be less than approximately 1 millimeter, e.g., less than approximately 500 micrometers or less than approximately 300 micrometers. In certain embodiments, the thickness of each layer 302 may be less than approximately 10 micrometers, e.g., less than approximately 10 micrometers, less than approximately 1 micrometer, less than approximately 500 nm, or less than approximately 100 nm, which may inhibit the nucleation and growth of spherulite crystals during annealing and the attendant degradation of optical properties, e.g., the generation of birefringence.

Figure 4:
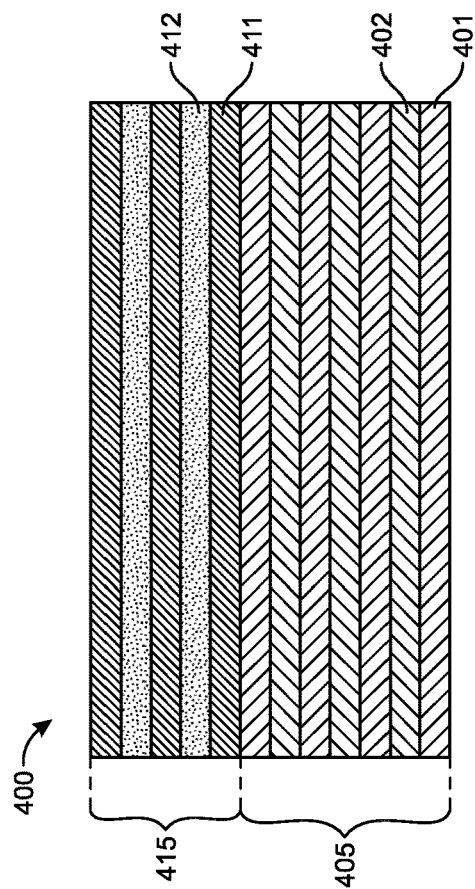
FIG. 4 is a cross-sectional illustration of an example multilayer polymer composite membrane including an anti-reflective coating according to further embodiments.

According to still further embodiments, FIG. 4 shows an example TPU-based membrane 400 having alternating polymer layers 401, 402 where each layer 401 may include an optically transparent aliphatic TPU layer and each layer 402 may include an optically transparent aromatic TPU layer. A further alternating stack of layers 411, 412 may be formed over one or both surfaces of the multilayer 405. For instance, layers 411, 412 may form an antireflective coating 415 where each layer 411 may include a relatively low refractive index material and each layer 412 may include a relatively high refractive index material, or vice versa. As used herein, a "low refractive index material" may, in some examples, be characterized by a refractive index of less than approximately 1.6, whereas a "high refractive index material" may, in some examples, be characterized by a refractive index of approximately 1.6 or greater.

Figure 5:
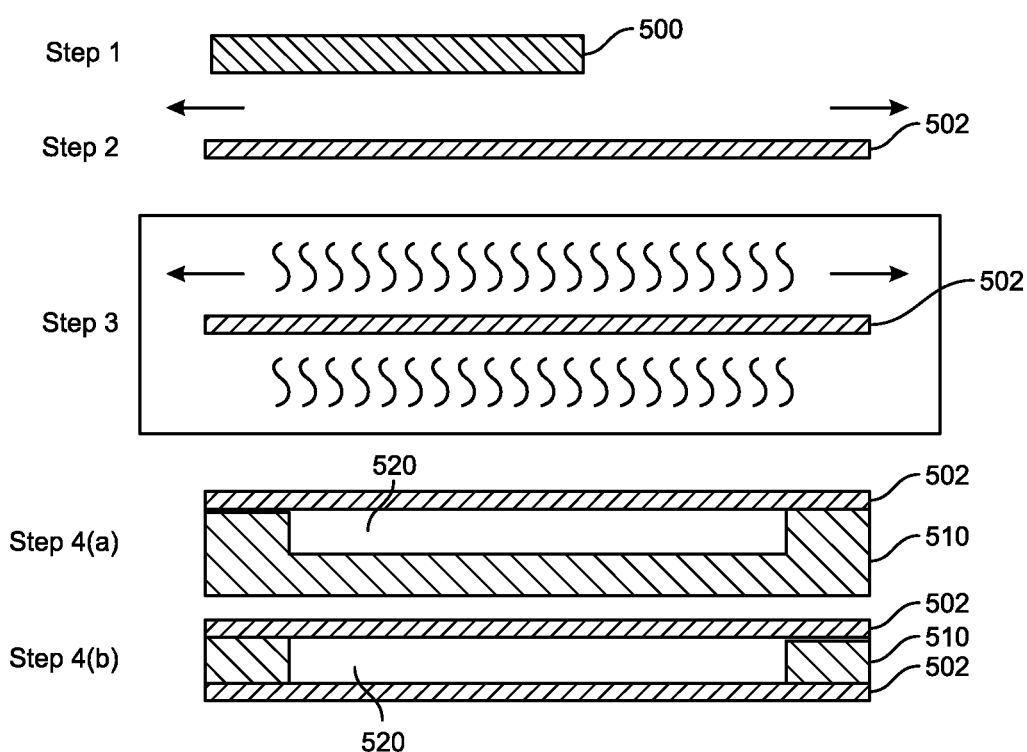
FIG. 5 illustrates an example method for forming and integrating a multilayer composite membrane with a liquid lens according to certain embodiments.

Referring to FIG. 5, illustrated is an example method for forming and co-integrating a multilayer membrane having the requisite elastic response for actuation thereof. According to some embodiments, TPU-based multilayer membrane 500 (such as the multilayer membranes 100, 200, 300, or 400 described above with reference to any of FIGS. 1-4) may be formed in Step 1 using any suitable deposition process, such as casting or co-extrusion.

In Step 2, a stretching process may be used to form a strained membrane 502. In some embodiments, the extent of induced strain may be up to approximately 200%, e.g., less than approximately 200%, less than approximately 100%, less than approximately 50%, or less than approximately 10%, including ranges between any of the foregoing values. Referring to step 3, an optional annealing process may be used (e.g., while maintaining the applied tension) to relax the polymer chains within strained membrane 502. By way of example, the annealing temperature may be less than the melting temperature ($T_m$) and above the glass transition temperature ($T_g$) of the membrane, and the annealing time may vary from approximately 30 minutes to approximately 24 hours, although lesser and greater annealing times may be used.

Following annealing, while maintaining the induced stress, the strained membrane 502 may be cooled (e.g., to approximately 23° C.) and, as shown schematically in Step 4, bonded to a transparent substrate 510. The annealed membrane 502 may be affixed to one side of the substrate 510 (Step 4a) or to opposing sides of the substrate 510 (Step 4b). A lens fluid 520 may be encapsulated between the strained membrane 502 and the substrate 510. Substrate 510 may include a lens or other optically transparent structure.

Substrate 510 may be a rigid, fluid impermeable structure and may, by way of example, include a material such as a polycarbonate, rubber, elastic polymer, or a glass plate. The lens fluid 520 encapsulated by the substrate 510 and the membrane 502 may have an appropriate index of refraction and viscosity for use in a liquid lens and may include polyphenyl ethers, polyphenyl thioethers, silicone oil, mineral oil, glycerin, or water, among others. Lens fluid 520 may be a clear or tinted fluid.

Figure 6:
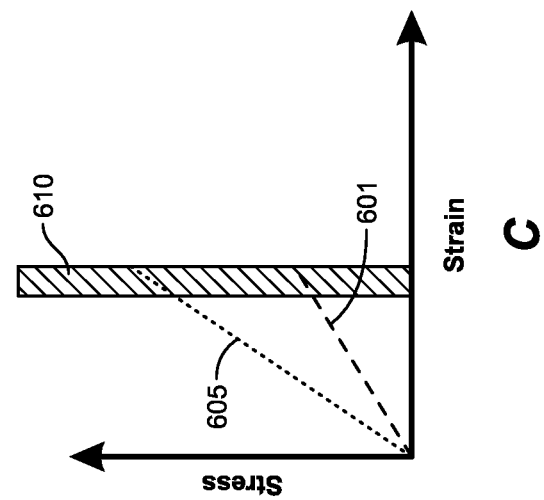
FIG. 6 shows the elastic and plastic deformation response for aliphatic TPU layers and example barrier layers according to some embodiments.
Figure 6:
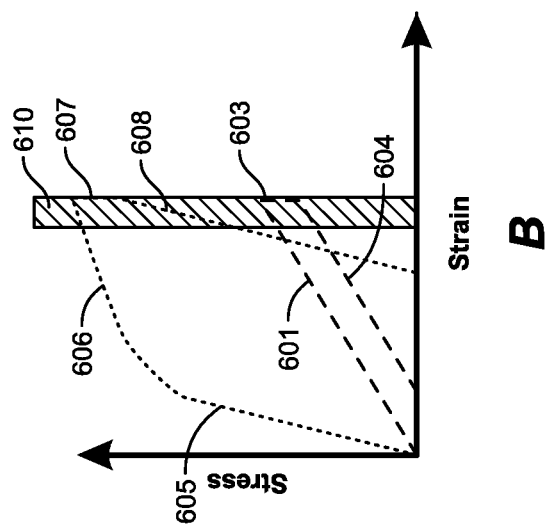
Figure 6:
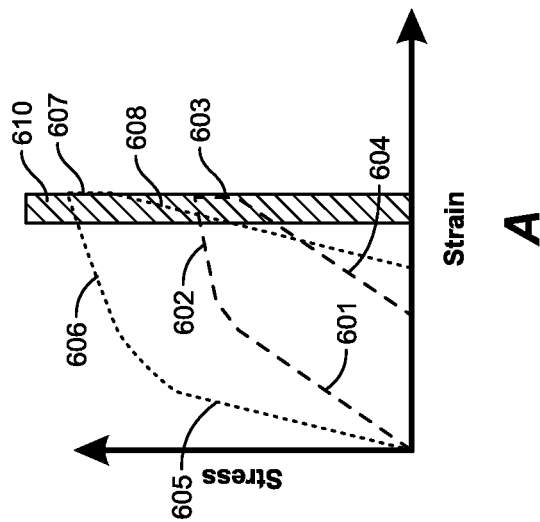

The deformation response of example membranes is shown in FIG. 6, where dashed lines 601, 602, 603, 604 represent aliphatic TPU layers (e.g., layers 101, 201, 301, 401 in FIGS. 1-4) and dotted lines 605, 606, 607, 608 represent barrier layers (e.g., layers 102, 202, 302, 402 in FIGS. 1-4). According to various embodiments, FIGS. 6A, 6B, and 6C represent different cases of pre-stretch, annealing, and actuation. Segments 601 and 605 represent elastic deformation regions, while segments 602 and 606 represent plastic deformation regions. According to some embodiments, segments 603 and 607 represent the annealing relaxation of the respective layers, and segments 604 and 608 represent new elastic regions after annealing. The shaded zones 610 represent the strain area under actuation. In some embodiments, a TPU-based membrane may be placed in a state of uniaxial or biaxial tension, i.e., along one or more directions parallel to a major surface of the membrane. In some embodiments, an in-plane line tension, which is the total force divided by the total length of the perimeter of the film, of at least approximately 10 N/m (e.g., 10 N/m, 50 N/m, 100 N/m, 200 N/m, 300 N/m, 400 N/m, 500 N/m, or more), including ranges between any of the foregoing values) may be applied to and maintained by a TPU-based membrane.

The stress-strain characteristics of aliphatic TPU layers and barrier layers that are pre-stretched to plastic deformation regions 602, 606 before annealing are shown in FIG. 6A. While maintaining tension, during an annealing step, the respective layers may relax as illustrated by segments 603, 607. After annealing, new elastic regions 604 and 608 are generated, where the deformation response during typical operation may correspond to the portions of segments 604, 608 within the shaded area 610.

The stress-strain characteristics of aliphatic TPU layers and barrier layers that are pre-stretched before annealing are shown in FIG. 6B. In the embodiment of FIG. 6B, the pre-stretched aliphatic TPU layers may remain within an elastic region 601, whereas the barrier layers may be pre-stretched to a plastic deformation region 606. While maintaining tension during an annealing step, the respective layers may relax as illustrated by segments 603, 607. After annealing, new elastic regions 604 and 608 are generated, where the deformation response during typical operation may correspond to the portions of segments 604, 608 within the shaded area 610. FIG. 6C describes both aliphatic TPU layers and barrier layers that are pre-stretched and operated within membrane elastic regions without an annealing process.

Disclosed are thermoplastic polyurethane (TPU)-based multilayer membranes. Example multilayer polymer membranes may be optically transparent (>90%), provide an effective barrier layer, e.g., to liquid lens compositions, and exhibit a stable, reproducible elastic response under small strains over multiple cycles. According to certain embodiments, a bilayer TPU-based membrane may have an A-B stack structure and a tri-layer TPU-based membrane may have an A-B-A or A-B-C stacked structure, where each layer A or layer C may include an optically transparent aliphatic or aromatic TPU layer and intervening layer B may include an optically transparent barrier layer such as PVDF, ACLAR, or EVOH. In some embodiments, the barrier layer (layer B) may be thinner than the TPU layer (layer(s) A or C). In certain embodiments, the difference in the solubility parameters of polymer A and polymer B may be less than approximately 10 MPa$^{1/2}$ or less than approximately 5 MPa$^{1/2}$. According to further embodiments, a multilayer membrane may have an A-B-A-B- . . . A-B-A stacked architecture, where each layer A may include an optically transparent aliphatic TPU layer and each layer B may include an optically transparent aromatic TPU layer having a thickness of less than approximately 10 micrometers, e.g., less than 500 nm or less than 100 nm. According to still further embodiments, a multilayer membrane may further include a supplemental stacked architecture of alternating high- and low-refractive index layers that form an antireflective coating. The multilayer TPU-based membranes may be co-extruded, stretched, and annealed to achieve an elastic response during actuation of a liquid lens.

EXAMPLE EMBODIMENTS

Example 1: A liquid lens includes a transparent substrate, a multilayer thermoplastic polyurethane (TPU)-based membrane overlying at least a portion of the transparent substrate, and a liquid layer disposed between and abutting the transparent substrate and the multilayer thermoplastic polyurethane-based membrane.

Example 2: The liquid lens of Example 1, where the multilayer thermoplastic polyurethane-based membrane includes (a) a transparent thermoplastic polyurethane layer and (b) a transparent barrier layer overlying the transparent thermoplastic polyurethane layer.

Example 3: The liquid lens of Example 2, where the transparent thermoplastic polyurethane layer includes an aliphatic thermoplastic polyurethane layer or an aromatic thermoplastic polyurethane layer.

Example 4: The liquid lens of any of Examples 2 and 3, where the transparent barrier layer includes a polymer selected from polyvinylidene fluoride, chlorotrifluoroethylene, polyvinylidene chloride, and ethylene vinyl alcohol copolymer.

Example 5: The liquid lens of any of Examples 2-4, where the transparent barrier layer is thinner than the transparent thermoplastic polyurethane layer.

Example 6: The liquid lens of any of Examples 2-5, where a total thickness of the multilayer thermoplastic polyurethane-based membrane is less than approximately 1 mm.

Example 7: The liquid lens of any of Examples 2-6, further including an antireflective coating directly overlying the transparent barrier layer.

Example 8: The liquid lens of any of Examples 2-7, including a further transparent thermoplastic polyurethane layer overlying the transparent barrier layer.

Example 9: The liquid lens of Example 8, including an antireflective coating directly overlying the further transparent thermoplastic polyurethane layer.

Example 10: The liquid lens of Example 1, where the multilayer thermoplastic polyurethane-based membrane includes a transparent aliphatic thermoplastic polyurethane layer and a transparent aromatic thermoplastic polyurethane layer overlying the transparent aliphatic thermoplastic polyurethane layer.

Example 11: The liquid lens of Example 10, where the multilayer thermoplastic polyurethane-based membrane includes alternating layers of a transparent aliphatic thermoplastic polyurethane material and a transparent aromatic thermoplastic polyurethane material.

Example 12: The liquid lens of Example 11, where each of the alternating layers has a thickness of less than approximately 10 micrometers.

Example 13: The liquid lens of any of Examples 10-12, further including an antireflective coating disposed directly over the multilayer thermoplastic polyurethane-based membrane.

Example 14: A liquid lens includes a transparent multilayer thermoplastic polyurethane-based membrane, the membrane having a reversible elastic response to strains up to approximately 2% and being configured to limit the transpiration of fluid therethrough to less than approximately $10^{-2}$ g/m$^2$/day.

Example 15: The liquid lens of Example 14, where the multilayer thermoplastic polyurethane-based membrane includes (a) a transparent thermoplastic polyurethane layer and (b) a transparent barrier layer overlying the transparent thermoplastic polyurethane layer, where the transparent barrier layer includes a polymer selected from polyvinylidene fluoride, chlorotrifluoroethylene, polyvinylidene chloride, and ethylene vinyl alcohol copolymer.

Example 16: The liquid lens of Example 14, where the multilayer thermoplastic polyurethane-based membrane includes (a) a transparent aliphatic thermoplastic polyurethane layer and (b) a transparent aromatic thermoplastic polyurethane layer overlying the transparent aliphatic thermoplastic polyurethane layer.

Example 17: A method includes (a) forming a transparent thermoplastic polyurethane layer over at least a portion of a transparent substrate, and (b) forming a transparent polymer layer directly over the transparent thermoplastic polyurethane layer to form a multilayer thermoplastic polyurethane-based membrane.

Example 18: The method of Example 17, where the transparent thermoplastic polyurethane layer includes an aliphatic thermoplastic polyurethane or an aromatic thermoplastic polyurethane.

Example 19: The method of any of Examples 17 and 18, where the polymer layer includes a polymer selected from polyvinylidene fluoride, chlorotrifluoroethylene, polyvinylidene chloride, and ethylene vinyl alcohol copolymer.

Example 20: The method of any of Examples 17-19, further including applying an in-plane tensile stress to the multilayer thermoplastic polyurethane-based membrane.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 700 in FIG. 7) or that visually immerses a user in an artificial reality (e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
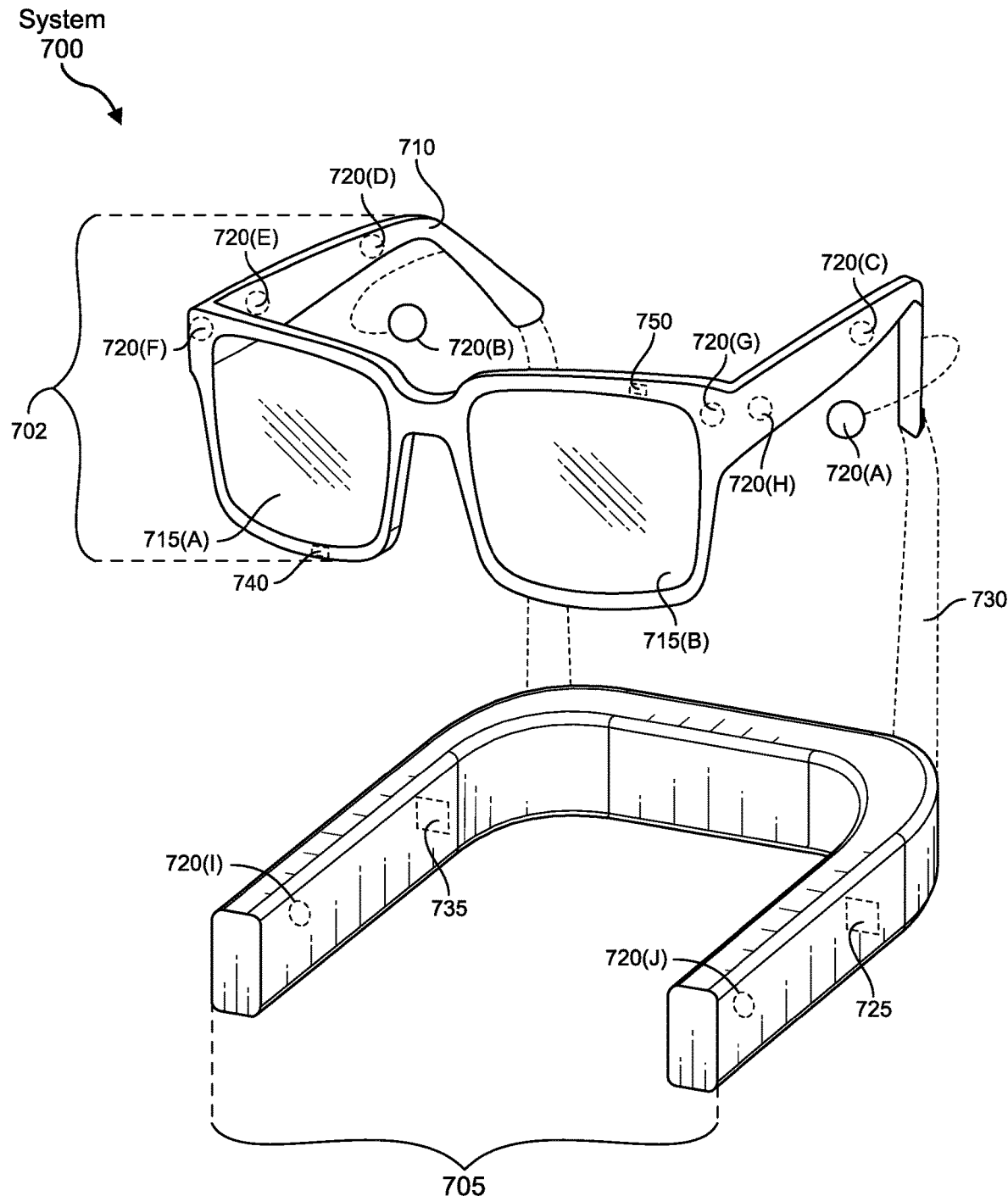
FIG. 7 is an illustration of exemplary augmented-reality glasses that may be used in connection with embodiments of this disclosure.
Figure 8:
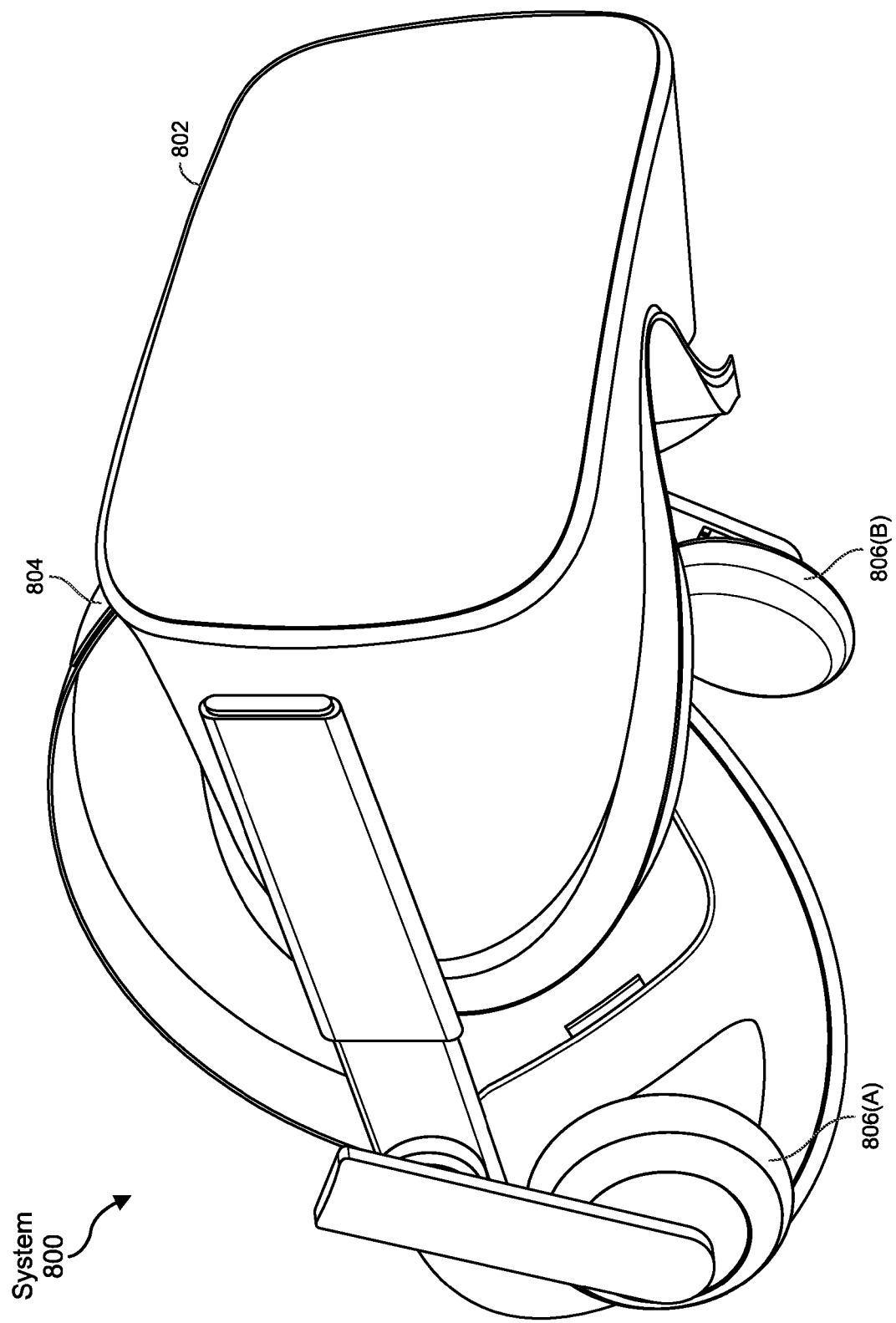
FIG. 8 is an illustration of an exemplary virtual-reality headset that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

Augmented-reality system 700 may also include a microphone array with a plurality of acoustic transducers 720(A)-720(J), referred to collectively as acoustic transducers 720. Acoustic transducers 720 may be transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(F) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a Bluetooth connection). In still other embodiments, acoustic transducers 720(A) and 720(B) may not be used at all in conjunction with augmented-reality system 700.

Acoustic transducers 720 on frame 710 may be positioned along the length of the temples, across the bridge, above or below display devices 715(A) and 715(B), or some combination thereof. Acoustic transducers 720 may be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source.

Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 8, output audio transducers 806(A) and 806(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 7, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a TPU-based membrane that comprises or includes an aliphatic compound include embodiments where a TPU-based membrane consists essentially of an aliphatic compound and embodiments where a TPU-based membrane consists of an aliphatic compound.

What is claimed is:

1. A liquid lens comprising:
a transparent substrate;
a multilayer membrane overlying the transparent substrate, the multilayer membrane comprising two or more thermoplastic polyurethane layers; and
a liquid layer disposed between the transparent substrate and the multilayer membrane.

2. The liquid lens of claim 1, wherein the multilayer membrane comprises a transparent aliphatic thermoplastic polyurethane layer and a transparent aromatic thermoplastic polyurethane layer.

3. The liquid lens of claim 1, wherein a total thickness of the multilayer membrane is less than approximately 1 mm.

4. The liquid lens of claim 1, wherein the multilayer membrane comprises alternating layers of a transparent aliphatic thermoplastic polyurethane material and a transparent aromatic thermoplastic polyurethane material.

5. The liquid lens of claim 4, wherein each of the alternating layers has a thickness of less than approximately 10 micrometers.

6. The liquid lens of claim 1, wherein the multilayer membrane comprises a transparent barrier layer.

7. The liquid lens of claim 6, wherein the transparent barrier layer comprises a polymer selected from the group consisting of polyvinylidene fluoride, chlorotrifluoroethylene, polyvinylidene chloride, and ethylene vinyl alcohol copolymer.

8. The liquid lens of claim 1, further comprising an antireflective coating disposed directly over the multilayer membrane.

9. The liquid lens of claim 1, wherein the multilayer membrane is configured to have a reversible elastic response to strains up to approximately 2% and to limit transpiration of fluid therethrough to less than approximately $10^{-2}$ g/m$^2$/day.

10. A liquid lens comprising:
a transparent substrate;
a multilayer membrane overlying the transparent substrate, the multilayer membrane comprising alternating layers of a thermoplastic polyurethane and an optically transparent polymer; and
a liquid layer disposed between the transparent substrate and the multilayer membrane.

11. The liquid lens of claim 10, wherein the thermoplastic polyurethane layers comprise a transparent aliphatic thermoplastic polyurethane material or a transparent aromatic thermoplastic polyurethane material.

12. The liquid lens of claim 10, wherein the optically transparent polymer layers comprise a polymer selected from the group consisting of polyvinylidene fluoride, chlorotrifluoroethylene, polyvinylidene chloride, and ethylene vinyl alcohol copolymer.

13. The liquid lens of claim 10, wherein a thickness of each thermoplastic polyurethane layer is greater than a thickness of each optically transparent polymer layer.

14. A method comprising:
forming alternating layers of a transparent thermoplastic polyurethane layer and a transparent polymer layer over a transparent substrate;
to form a multilayer membrane; and
forming a liquid layer between the transparent substrate and the multilayer membrane to form a liquid lens.

15. The method of claim 14, wherein the transparent thermoplastic polyurethane layer comprises an aliphatic thermoplastic polyurethane material or an aromatic thermoplastic polyurethane material.

16. The method of claim 14, wherein the transparent polymer layer comprises a polymer selected from the group consisting of polyvinylidene fluoride, chlorotrifluoroethylene, polyvinylidene chloride, and ethylene vinyl alcohol copolymer.

17. The method of claim 14, wherein a thickness of the transparent thermoplastic polyurethane layer is greater than a thickness of the transparent polymer layer.

18. The method of claim 14, further comprising forming an antireflective coating over the multilayer membrane.

19. The method of claim 14, further comprising applying an in-plane tensile stress to the multilayer membrane.

20. The method of claim 14, further comprising forming a liquid layer over the multilayer membrane.

* * * * *